(12) United States Patent
Bourque et al.

(10) Patent No.: US 7,185,458 B2
(45) Date of Patent: Mar. 6, 2007

(54) PROTECTIVE FLANGE FOR A WINDOW OPENING

(75) Inventors: Jeffrey Gerard Bourque, Novi, MI (US); Paul Joseph Kolokowski, Southgate, MI (US); Michael James Lesle, Toledo, OH (US); Larry R. Lyke, Novi, MI (US); Thomas William Peyton, Jr., Allen Park, MI (US); Scott Saxon, Northville, MI (US); Marcus Tanksley, Farmington Hills, MI (US); Richard Mark Weinert, Novi, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 46 days.

(21) Appl. No.: 10/690,293

(22) Filed: Oct. 21, 2003

(65) Prior Publication Data

US 2004/0098933 A1 May 27, 2004

Related U.S. Application Data

(60) Provisional application No. 60/429,807, filed on Nov. 27, 2002.

(51) Int. Cl.
*E05D 15/06* (2006.01)

(52) U.S. Cl. .................................... 49/413; 296/190.1

(58) Field of Classification Search ................. 49/116, 49/118, 413; 296/146.16, 201, 190.1; 160/105
See application file for complete search history.

(56) References Cited

U.S. PATENT DOCUMENTS

| 3,321,234 A | * | 5/1967 | Harrell et al. | ............... 296/166 |
| 4,124,054 A | * | 11/1978 | Spretnjak | ..................... 160/90 |
| 4,785,583 A | * | 11/1988 | Kawagoe et al. | ............. 49/404 |
| 5,473,840 A | | 12/1995 | Gillen et al. | |
| 5,505,023 A | | 4/1996 | Gillen et al. | |
| 6,018,913 A | | 2/2000 | Lin | |
| 6,119,401 A | * | 9/2000 | Lin et al. | ..................... 49/361 |
| 6,125,585 A | | 10/2000 | Koneval et al. | |
| 6,591,552 B1 | * | 7/2003 | Rasmussen | .................. 49/413 |
| 2003/0213179 A1 | * | 11/2003 | Galer | ......................... 49/413 |
| 2004/0020131 A1 | * | 2/2004 | Galer et al. | ................... 49/413 |

* cited by examiner

*Primary Examiner*—Jerry Redman

(57) ABSTRACT

The present invention is directed to a flange attached to a window panel with an opening. The flange prevents an object from contacting the bottom edge of the opening as the object is passed through the opening. Moreover, the cargo rests on the flange rather than the bottom edge to prevent the cargo from damaging the window panel.

9 Claims, 2 Drawing Sheets

PROTECTIVE FLANGE FOR A WINDOW OPENING

RELATED APPLICATION

This application claims the benefit of the filing date under 35 U.S.C. § 119(e) of U.S. Provisional Application No. 60/429,807, filed Nov. 27, 2002, the entire contents of which is incorporated herein by reference.

BACKGROUND

This invention relates a window assembly for vehicles. More specifically, the invention relates to a flange for protecting an edge of an opening in the window assembly.

The edges of openings in a vehicle body structure, such as a window, are subject to damage (e.g. chips, scratches, and dings) as an object passes through the opening or rests on the edge of the opening. While the primary functional purpose of a sliding window assembly in a vehicle is for ventilation, it is not uncommon for a user to take advantage of the window as a pass-through opening for supporting lengthy cargo. For example, damage of an exposed edge of glass in a vehicle opening may result from the pass-through of an object or resting of an object on the edge of the glass in a slider backlight assembly commonly found on pick-up truck vehicles.

The downward force exerted by resting such cargo on the expose edge of the window opening should, in most cases, not be of major concern by itself, since the compressive strength of most window panels is quite good. However, lateral forces (fore and aft), abrasion, and/or impact forces resulting from such cargo resting on the edge of the opening may damage the panel.

BRIEF SUMMARY OF THE INVENTION

In overcoming the above mentioned and other drawbacks, the present invention is directed to a flange attached to a window panel with an opening. The flange prevents an object from contacting the bottom edge of the opening as the object is passed through the opening. Moreover, the cargo rests on the flange rather than the bottom edge to prevent the cargo from damaging the window panel.

The flange may be attached either to the inside or outside of the window panel. The upper surface of the flange may be at the same elevation as the bottom edge of the opening, or it may be higher or lower than the bottom edge. The flange may be attached to the window panel with screws, bolts, adhesives, or any other suitable attachment mechanism. The window panel may be made of glass or plastic, and the flange may be made of metal, plastic, or any suitable material that can withstand the loads from the cargo. The flange may have a contour which biases the object away from the sides of the opening.

Other advantages and features of the invention will be apparent from the following detailed description and from the claims.

BRIEF DESCRIPTION OF THE DRAWINGS

The accompanying drawings, incorporated in and forming a part of the specification, illustrate several aspects of the present invention. The components in the figures are not necessarily to scale, emphasis instead being placed on illustrating the principles of the invention. Moreover, in the figures, like reference numerals designate corresponding parts throughout the views. In the drawings.

DETAILED DESCRIPTION

An opening in a vehicle body structure is subject to damage (e.g., chips, scratches, and dings) when an object is passed through the opening or rests on an edge of the opening. For example, damage can occur to a sliding glass panel assembly used in the rear window or backlight assembly of pickup trucks. It is not uncommon for users to open the sliding glass panel and pass cargo through the opening. As the cargo rests on the edge of the opening, the force exerted by the cargo can damage the exposed edge. Embodiments of the invention discussed herein are directed to an apparatus that prevents damage to the window panel by incorporating a protective flange in the window assembly.

Figure 1A:
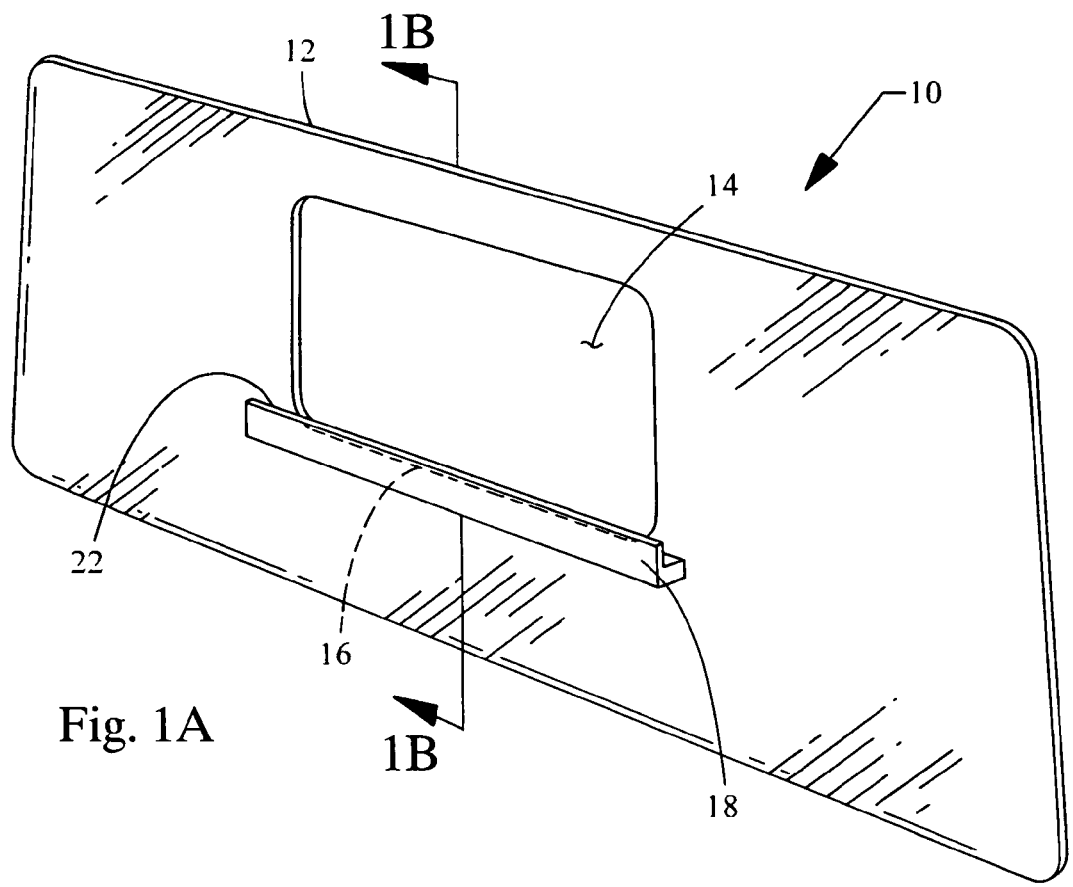
FIG. 1A is a side view of a window assembly with a protective flange in accordance with an embodiment of the invention.
Figure 1B:
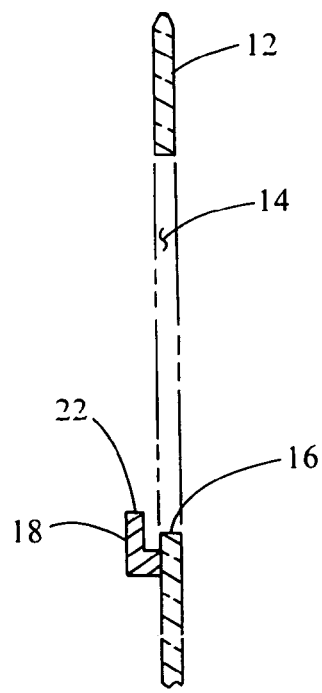
FIG. 1B is a cross-sectional view of the flange along the line 1B—1B of FIG. 1A.

FIGS. 1A and 1B depict a side view and a cross-sectional view, respectively, of a window assembly 10. The window assembly 10 includes a fixed panel 12 made of glass or plastic with an opening 14. A sliding panel mounted to the panel 12 with hinges may be used to cover the opening 14. A flange 18 is affixed to the fixed glass panel 12 and is positioned parallel to a lower edge 16 of the opening 14. As such, cargo extending through the opening 14 rests on top of the flange 18 and not the lower edge 16. The flange 18, therefore, protects the exposed edge 16 of the panel 12 from direct contact with cargo that might otherwise come to rest on the edge of the panel.

In one example, the panel 12 is part of the backlight assembly of a vehicle, such as a pickup truck. Accordingly, cargo can be placed in the bed of the truck with some of the cargo extending through the opening 14. As shown, the flange 18 is attached to the inside of the panel 12 and is about the same length or longer than bottom edge 16 of the opening 14 to ensure the cargo is entirely supported by the flange 18 if the cargo moves towards either side of the opening 14. A top surface 22 of the flange 18 is shown elevated above the edge lower 16. Thus, the cargo rests on the flange 18 rather than the lower edge 20 of the opening 14, such that the cargo exerts a downward force on the flange 18 and not on the edge 20. Moreover, lateral forces (fore and aft), abrasion, and/or impact forces that typical result from resting the cargo directly on the edge 16 are eliminated.

Figure 2A:
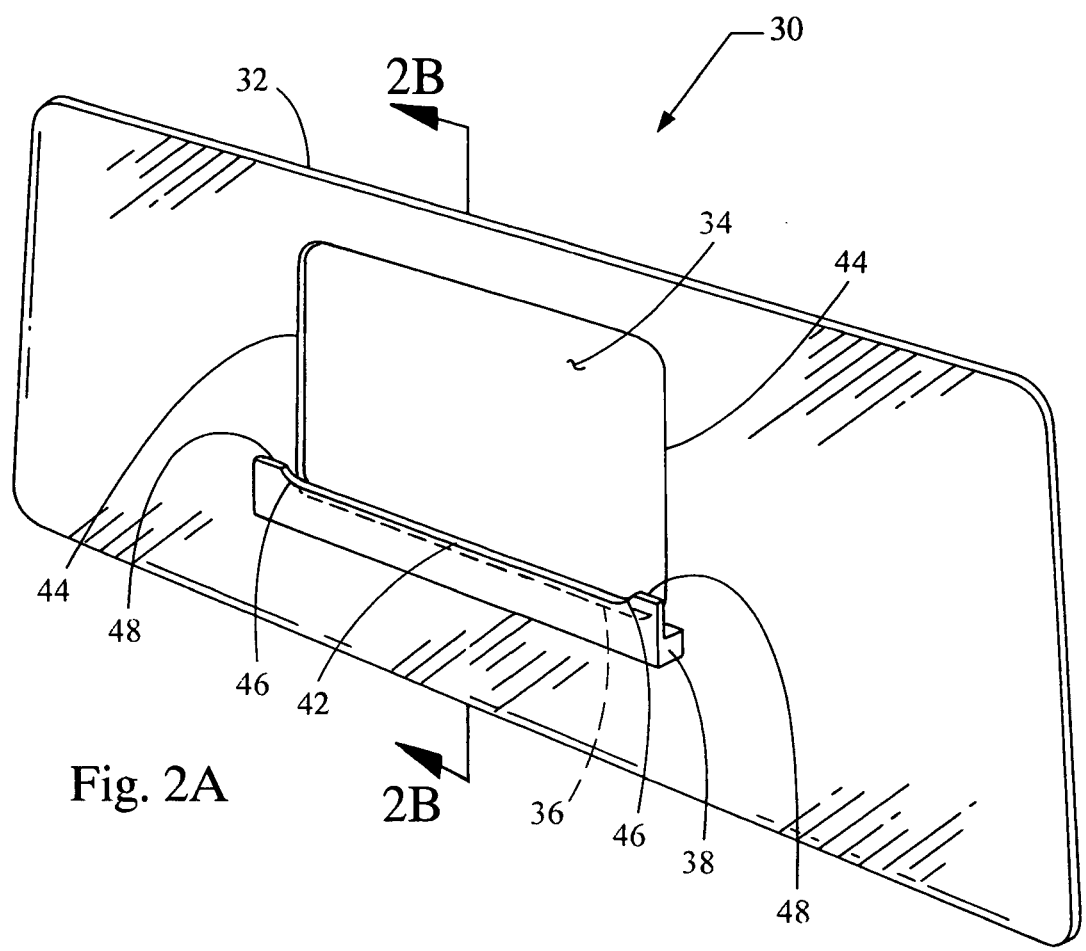
FIG. 2A is a side view of a window assembly with a protective flange in accordance with another embodiment of the invention.
Figure 2B:
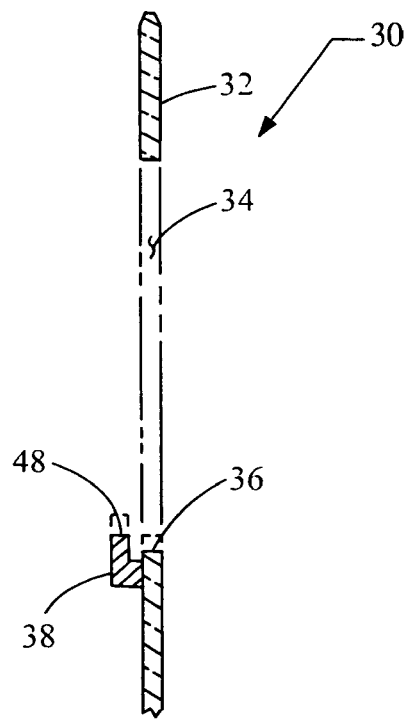
FIG. 2B is a cross-sectional view of the flange along the line 2B—2B of FIG. 2A.

Another embodiment shown in FIGS. 2A and 2B as a window assembly 30 includes a fixed glass panel 32 with an opening 34 having a bottom edge 36. A flange 38 is affixed to the glass panel 32. In this embodiment the flange 38 has a generally L-shaped cross section throughout its length, but is contoured, as can be seen in FIG. 2A, so that the flange is lower in a central region 42. This contour helps guide an object passing through the opening 34 towards the central region 42 and away from the side edges 44 of the opening 34 to prevent or at least minimize the potential for contact between the object extending through the opening 34 and the side edges 44.

As shown, the outer regions 46 of a top surface 48 of the flange 38 may have an arcuate shape. Alternatively, these regions may be straight, that is, the outer regions may angle upwards from the central region 42.

Similar to the flange 18 discussed above, the flange 38 is parallel to the bottom edge 40 and is longer than the opening 34. Further, the top surface 48 of the flange 38 is elevated above the bottom edge 30. Therefore, like the embodiment shown in FIGS. 1A and 1B, cargo extending through the opening 34 rests on the flange 38 rather than on the bottom edge 36 of the opening, thereby minimizing or eliminating wear and tear on the panel 32.

Implementations of the flange are not limited to those shown in FIGS. 1A through 2B. For example, in other implementations, the top surface of the flange can be positioned at the same level as the bottom edge of the opening. The flange can be affixed to the outside of the glass panel. In such a configuration, the top surface of the flange may be at a slightly lower elevation than the bottom edge. The flange can be made from glass, plastic, metal, or any other suitable material that is able to withstand the loads the imparted by the cargo.

As shown in the illustrated embodiments, the vertical extending portion of the flanges are spaced apart from the window panel. Although the flange as depicted has a generally L-shaped cross section, other cross sections and non-uniform shapes are possible. In some configurations, the flange is a rectangular block mounted flush against the window panel. The flange can be attached to the window by any suitable attachment mechanism, such as bolts, screws or adhesives.

It is therefore intended that the foregoing detailed description be regarded as illustrative rather than limiting, and that it be understood that it is the following claims, including all equivalents, that are intended to define the spirit and scope of this invention. For example, the flange can be made from a plastic or from a metal.

What is claimed is:

1. A window assembly comprising:
    a window with an opening; and
    a flange attached to a lower region of the window, an upper surface of the flange being substantially parallel to a bottom edge of the opening, the upper surface of the flange having a central region and outer regions, the central region being at an equal or higher elevation relative to the bottom edge of the opening along its entire width to prevent contact between cargo extending through the opening and the bottom edge of the opening, and the outer regions being at a higher elevation relative to the central region for urging the cargo towards the central region of the flange.

2. The window assembly of claim 1, wherein the upper surface of the central region is at substantially the same elevation as the bottom edge of the opening.

3. The window assembly of claim 1, wherein the flange is longer than the bottom of the opening.

4. The window assembly of claim 1, wherein the flange has a substantially L-shaped cross section.

5. The window assembly of claim 1, wherein the flange is attached to the inside of the window.

6. The window assembly of claim 1, wherein the flange is metal.

7. The window assembly of claim 1, wherein the flange is plastic.

8. The window assembly of claim 1, wherein the flange is attached to the window with an adhesive.

9. The window assembly of claim 1, wherein the flange is attached to an exterior lower region of the window.

\* \* \* \* \*